United States Patent
Myers et al.

(10) Patent No.: US 9,267,415 B2
(45) Date of Patent: Feb. 23, 2016

(54) HEAT EXCHANGER EQUIPPED WITH THERMAL ELECTRIC DEVICE FOR ENGINE EXHAUST CARBON DIOXIDE COLLECTION SYSTEM

(71) Applicant: DELPHI TECHNOLOGIES, INC., Troy, MI (US)

(72) Inventors: Bruce A. Myers, Kokomo, IN (US); David W. Ihms, Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 339 days.

(21) Appl. No.: 13/763,767

(22) Filed: Feb. 11, 2013

(65) Prior Publication Data
US 2013/0186075 A1    Jul. 25, 2013

Related U.S. Application Data

(63) Continuation-in-part of application No. 12/980,528, filed on Dec. 29, 2010, now Pat. No. 8,480,798.

(51) Int. Cl.
*B01D 53/92* (2006.01)
*F01N 5/02* (2006.01)
(Continued)

(52) U.S. Cl.
CPC .............. *F01N 5/025* (2013.01); *B01D 53/92* (2013.01); *F01N 3/04* (2013.01); *F01N 3/0857* (2013.01); *F01N 3/0871* (2013.01); *F01N 5/02* (2013.01); *B01D 2257/504* (2013.01); *F01N 2240/02* (2013.01); *F01N 2570/10* (2013.01); *Y02T 10/16* (2013.01); *Y02T 10/20* (2013.01)

(58) Field of Classification Search
None
See application file for complete search history.

(56) References Cited

U.S. PATENT DOCUMENTS

| 3,691,140 A | 9/1972 | Silver |
| 5,857,324 A | 1/1999 | Scappatura et al. |

(Continued)

FOREIGN PATENT DOCUMENTS

| DE | 10 2008 023832 A1 | 11/2009 |
| EP | 1 475 532 A2 | 11/2004 |

(Continued)

OTHER PUBLICATIONS

Lackner, Klaus S.: "Washing Carbon Out of the Air", Scientific American, Jun. 2010, pp. 66-71.

(Continued)

*Primary Examiner* — Duane Smith
*Assistant Examiner* — Phillip Shao
(74) *Attorney, Agent, or Firm* — Lawrence D. Hazelton

(57) ABSTRACT

A system for separating carbon dioxide gas from internal combustion engine exhaust and an electricity generating heat exchanger for the system. The system includes a scrubber tank containing a carbon dioxide absorbent fluid and configured to bubble exhaust gas from the heat exchanger through the carbon dioxide absorbent fluid, whereby carbon dioxide gas is absorbed by the carbon dioxide absorbent fluid. A carbon dioxide storage means stores the carbon dioxide released in a heat exchanger. The heat exchanger cools the exhaust gas emitted by the internal combustion engine, and includes a thermal electric generator (TEG) configured to couple thermally the exhaust gas chamber to the absorber fluid chamber in a manner effective to heat the CO2 absorbent fluid by heat from the engine exhaust to release CO2 gas from the CO2 absorbent fluid and generate electricity in response to a temperature difference therebetween.

15 Claims, 3 Drawing Sheets

(51) Int. Cl.
*F01N 3/04* (2006.01)
*F01N 3/08* (2006.01)

(56) References Cited

U.S. PATENT DOCUMENTS

| | | |
|---|---|---|
| 6,364,938 B1 | 4/2002 | Birbara et al. |
| 6,387,337 B1 | 5/2002 | Pennline et al. |
| 6,475,460 B1 | 11/2002 | Max |
| 6,547,854 B1 | 4/2003 | Gray et al. |
| 6,733,667 B2 | 5/2004 | Max |
| 6,755,892 B2 | 6/2004 | Nalette et al. |
| 7,056,482 B2 | 6/2006 | Hakka et al. |
| 7,067,456 B2 | 6/2006 | Fan et al. |
| 7,621,991 B2* | 11/2009 | Ruan .............. 96/262 |
| 2008/0031801 A1 | 2/2008 | Lackner et al. |
| 2008/0044335 A1 | 2/2008 | Anttila et al. |
| 2010/0051859 A1 | 3/2010 | House et al. |
| 2010/0284866 A1 | 11/2010 | Jang et al. |
| 2011/0083831 A1 | 4/2011 | Richter et al. |
| 2012/0118162 A1 | 5/2012 | Ogawa et al. |
| 2012/0171105 A1 | 7/2012 | Cooper et al. |
| 2012/0227440 A1 | 9/2012 | Guidati et al. |
| 2012/0263627 A1 | 10/2012 | Fujita et al. |
| 2013/0004406 A1 | 1/2013 | Chung et al. |
| 2013/0079981 A1* | 3/2013 | Meisner .............. 701/36 |
| 2013/0298761 A1* | 11/2013 | Hamad .............. 95/11 |

FOREIGN PATENT DOCUMENTS

| | | |
|---|---|---|
| EP | 1857169 | 12/2007 |
| EP | 2 472 077 A1 | 7/2012 |
| WO | 2009084887 | 7/2009 |
| WO | 2012/100165 A1 | 7/2012 |

OTHER PUBLICATIONS

U.S. Appl. No. 12/980,582, filed Dec. 29, 2010, entitled "Vehicle System to Separate and Store Carbon Dioxide From Engine Exhaust".

European Search Report dated May 19, 2014.

\* cited by examiner

HEAT EXCHANGER EQUIPPED WITH THERMAL ELECTRIC DEVICE FOR ENGINE EXHAUST CARBON DIOXIDE COLLECTION SYSTEM

CROSS-REFERENCE TO RELATED APPLICATION

This application is a continuation-in-part application and claims the benefit under 35 U.S.C. §120 of U.S. patent application Ser. No. 12/980,528, filed Dec. 29, 2010, the entire disclosure of which is hereby incorporated herein by reference.

TECHNICAL FIELD OF INVENTION

The invention generally relates to a system using a carbon dioxide absorbent fluid for separating or capturing carbon dioxide gas from internal combustion engine exhaust and then storing that gas. More particularly, the invention relates to a heat exchanger equipped with a thermal electric device (TEG) for generating electricity from temperature difference in the heat exchanger.

BACKGROUND OF INVENTION

There is a continuing effort to increase the operating efficiency of vehicles, and reduce emissions. Internal combustion engine in vehicles generally emit carbon dioxide (CO2) as a by-product of an internal combustion process. Systems that extract CO2 from engine exhaust have been proposed. However, such systems often reduce operating efficiency of the vehicle on which they are installed.

SUMMARY OF THE INVENTION

In accordance with one embodiment of this invention, a electricity generating heat exchanger is provided. The heat exchanger is suitable for a vehicle equipped with an exhaust gas carbon dioxide (CO2) separator. The heat exchanger includes an exhaust gas chamber, an absorber fluid chamber, and a first thermal electric generator (TEG). The exhaust gas chamber is configured to guide engine exhaust through the heat exchanger. The absorber fluid chamber is configured to guide CO2 absorbent fluid through the heat exchanger. The first TEG is configured to couple thermally the exhaust gas chamber to the absorber fluid chamber in a manner effective to heat the CO2 absorbent fluid by heat from the engine exhaust to release CO2 gas from the CO2 absorbent fluid, and generate electricity in response to a temperature difference therebetween.

In another embodiment of the present invention, a system for separating carbon dioxide gas from internal combustion engine exhaust is provided. The system includes an internal combustion engine, a heat exchanger, a scrubber tank, a pump, and a carbon dioxide storage means. The internal combustion engine is configured to emit exhaust gas when operating. The exhaust gas is characterized as having an elevated temperature and includes carbon dioxide. The heat exchanger is configured to cool the exhaust gas emitted by the internal combustion engine. The scrubber tank contains a carbon dioxide absorbent fluid and is configured to bubble exhaust gas from the heat exchanger through the carbon dioxide absorbent fluid so that carbon dioxide gas is absorbed by the carbon dioxide absorbent fluid. The pump is configured to urge the carbon dioxide absorbent fluid through the heat exchanger. The carbon dioxide storage means is configured to store the carbon dioxide released in the heat exchanger. The heat exchanger includes an exhaust gas chamber configured to guide engine exhaust through the heat exchanger; an absorber fluid chamber configured to guide CO2 absorbent fluid through the heat exchanger; and a first thermal electric generator (TEG) configured to couple thermally the exhaust gas chamber to the absorber fluid chamber in a manner effective to heat the CO2 absorbent fluid by heat from the engine exhaust to release CO2 gas from the CO2 absorbent fluid and generate electricity in response to a temperature difference therebetween.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
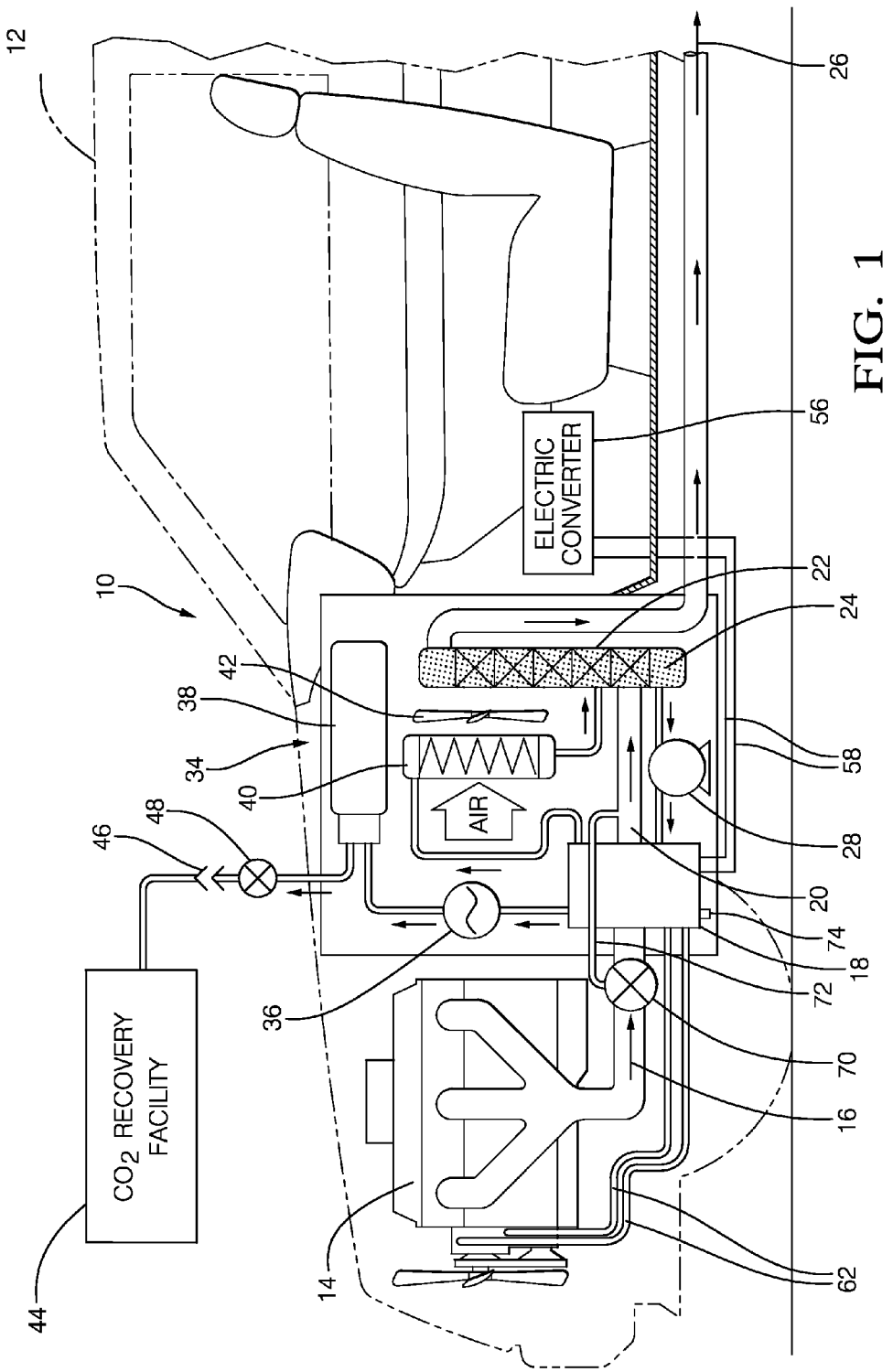
FIG. 1 is a diagram of a system for separating carbon dioxide gas from internal combustion engine exhaust in accordance with one embodiment.

FIG. 1 illustrates a non-limiting example of vehicle 12 equipped with an embodiment of a system 10 for separating carbon dioxide gas from exhaust gas 16 emitted by internal combustion engine 14. In this example, the internal combustion engine 14 that may be configured to propel the vehicle 12. However, stationary applications of engines are contemplated. Examples of suitable internal combustion engines include, but are not limited to, gasoline spark-ignition engines, compression ignition engines fueled with gasoline or diesel fuel, turbine engines, hybrid combustion/electric engines, and fuel cells such as solid oxide fuel cells. In general, the internal combustion engine 14 emits exhaust gas 16 when operating, and the exhaust gas 16 is generally characterized as having an elevated temperature. The exhaust gas may also include elevated levels of carbon dioxide. While not specifically shown, the exhaust gas will generally be downstream from known engine exhaust after treatment devices such as a catalytic converter.

The system 10 may include a heat exchanger 18 configured to cool the exhaust gas 16 emitted by the internal combustion engine 14, and so cooled exhaust gas 20 is generally passed out of the heat exchanger 18 to a scrubber tank 22. A more detailed explanation of the heat exchanger 18 is provided below with regard to FIG. 2. The heat exchanger 18 is preferably made of metal such as stainless steel, aluminum, or copper. The heat exchanger is preferably assembled using formed sheets of metal shaped and attached using manufacturing techniques that are well known to those in the heat exchanger arts.

The scrubber tank 22 is generally configured to contain a carbon dioxide absorbent fluid 24, hereafter often 'the fluid 24'. The scrubber tank 22 is also configured to bubble cooled exhaust gas 20 from the heat exchanger 18 through the carbon dioxide absorbent fluid 24, whereby carbon dioxide gas in the cooled exhaust gas 20 is absorbed by the fluid 24. Early testing indicated that Novec™ HFE7600 produced by 3M Company would be a suitable fluid. It is noted that 3M primarily markets this fluid as a heat transfer medium for use in electronics and other cooling applications. However, subsequent testing has indicated that other families of chemicals may be better suited for automotive applications where the exhaust gas 20 is emitted by an internal combustion engine propelling a vehicle.

By way of example and not limitation, suitable chemical families for use as the fluid 24 include a) an aliphatic di-functional nitrile, b) an aliphatic di-functional N,N-dimethyl substituted amide, c) an aliphatic di-functional N,N-diethyl substituted amide, d) an aliphatic di-functional N,N-dipropyl substituted amide, and e) an oligomeric poly-acrylonitrile (PAN).

Several known gas scrubber configurations would be suitable for use as or within the scrubber tank 22 to bring the fluid 24 into intimate contact with the cooled exhaust gas 20 to maximize the amount of $CO_2$ removed from the cooled exhaust gas 20. After the cooled exhaust gas passes through the scrubber tank 22, scrubbed exhaust gas 26 is emitted by the system 10.

The system 10 may also include a pump 28 configured to urge the fluid 24 through the heat exchanger 18, wherein the fluid 24 is heated as heat is transferred from the exhaust gas 16 to form cooled exhaust gas 20. The pump 28 is illustrated as being located between the heat exchanger 18 and the scrubber tank 22, but it could be located elsewhere in the circulation path of the fluid 24. As such the location of the pump 28 illustrated is a non-limiting example.

Figure 2:
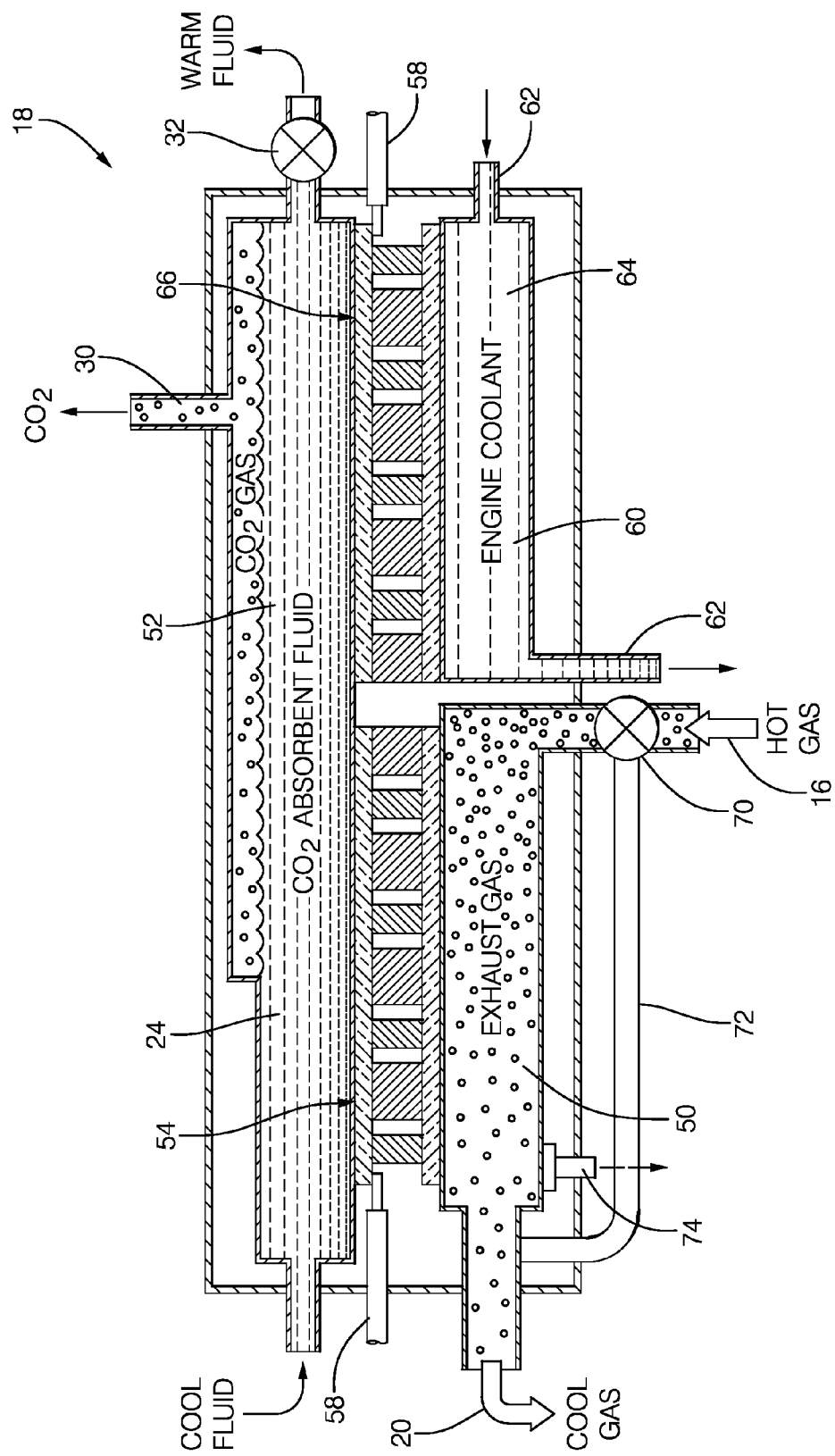
FIG. 2 is a diagram of a heat exchanger in the system of FIG. 1 in accordance with one embodiment.

FIG. 2 illustrates a non-limiting example of the heat exchanger 18. While not subscribing to any particular theory, but applying thermodynamic principles of heat conduction to the heat exchanger 18; as the exhaust gas 16 passes through the heat exchanger 18, heat is drawn from the exhaust gas 16 so cooled exhaust gas 20 exits the heat exchanger 18. Heat is drawn out of the exhaust gas 16 and transferred to the fluid 24, whereby the carbon dioxide absorbent fluid 24 releases the carbon dioxide ($CO_2$) gas that was absorbed when the fluid was in the scrubber tank 22. The arrangement of the system 10 includes an inherent energy-efficiency in that the system 10 uses heat in the exhaust gas 16 for heating the fluid 24 to release the $CO_2$, and so does not need to provide a separate heat source to release the $CO_2$ from the fluid 24.

As suggested by FIG. 2, the $CO_2$ generally rises out of the fluid 24 to the top of the heat exchanger 18 and accumulates around a $CO_2$ gas outlet 30. In one embodiment, the heat exchanger 18 may include a thermostat 32 to help regulate the temperature of the fluid 24 exiting the heat exchanger 18 so that the amount of $CO_2$ removed from the fluid 24 is maximized. It is noted that the heat exchanger 18 is generally configured to keep the exhaust gas 16 and the cooled exhaust gas 20 separated from the fluid 24, but does facilitate heat transfer from the exhaust gas 16 to the fluid 24.

Referring again to FIG. 1, the system 10 may also include a carbon dioxide storage means 34 configured to store the carbon dioxide released by the fluid 24 in the heat exchanger 18. As suggested by FIG. 1, one embodiment of the $CO_2$ storage means 34 may include a compressor 36 and a storage tank 38. The compressor 36 and the storage tank 38 may be configured to store $CO_2$ in liquid form. Also, the storage tank 38 is preferably sized so that the storage tank 38 does not need to be emptied any more frequently than the fuel tank (not shown) of the vehicle 12 needs to be filled with fuel.

The system 10 or the carbon dioxide storage means 34 may also include a carbon dioxide recovery facility 44, hereafter often facility 44. The facility is generally configured to empty the storage tank 38. The facility 44 may be part of a vehicle fueling station so that when the vehicle 12 is refueled, the storage tank 38 can be emptied. The storage tank 38 may be emptied by, for example, coupling the facility 44 to the storage tank 38 via a connection 46 and then operating a valve 48 so the contents of the storage tank 38 can be transferred to the facility 44. The facility 44 may be simply a larger storage tank that stores the contents from several vehicle storage tanks to await later transfer to a processing facility, or the facility 44 may be equipped to refine the contents received from the storage tank 38 and package carbon dioxide for storage at a permanent storage facility or for use by a consumer of carbon dioxide. The refinement process may also include recovering other chemicals or pollutants present in the storage tank 38, for example, but not limited to, carbon monoxide, nitric oxides, and unburned hydrocarbons.

The system 10 may also include a radiator 40 configured to receive fluid 24 from the heat exchanger 18 and cool the fluid 24 as it flows into the scrubber tank 22. The cooling by the radiator 40 may be assisted by a fan 42. It is desirable to cool the fluid 24 as much as possible since the fluid 24 generally is able to absorb more $CO_2$ at lower temperatures, about 25 C for example, than at higher temperatures, 100 C for example. It should be appreciated that the heat exchanger (40) and fan (42) replace the engine radiator and fan typically found on vehicles without the system 10. This is possible because system 10 transfers the engine coolant heat into the $CO_2$ absorbing liquid, thus eliminating the need for the conventional engine radiator and fan found on most vehicles.

It was recognized that overall system efficiency could be improved if the temperature difference between the exhaust gas 16 and the fluid 24 were further utilized. In particular, it was recognized that a thermal electric generator could be added to the heat exchanger 18 to form an electricity generating heat exchanger for a vehicle equipped with an exhaust gas carbon dioxide ($CO_2$) separator. By way of further explanation and not limitation, the heat exchanger generally includes or defines an exhaust gas chamber 50 configured to guide the exhaust gas 16 through the heat exchanger 18, and an absorber fluid chamber 52 configured to guide $CO_2$ absorbent fluid (i.e. the fluid 24) through the heat exchanger 18. The heat exchanger 18 also includes a first thermal electric generator (first TEG) 54 configured to couple thermally the exhaust gas chamber 50 to the absorber fluid chamber 52 in a manner effective to heat the fluid 24 by heat from the exhaust gas 16 to release $CO_2$ gas from the fluid 24 and generate electricity in response to a temperature difference between the exhaust gas chamber 50 and the absorber fluid chamber 52.

Thermoelectric generator module technologies suitable for exhaust gas heat energy recovery have been developeed by a number of companies including General Motors, Marlow Industries and Amerigon BSST. These generators typically use lead telluride or Skutterudite as the thermoelectric conversion material. Also suitable TEG modules based on a calcium magnesium oxide conversion material are commercially available from Thermal Electronics Corp.—CMO series. Thermoelectric generator modules suitable for engine coolant heat recovery typically use bismuth telluride thermoelectric conversion materials and are commercially available from a number of companies including Marlow Industries (TG12 series), and Hi-Z Technology (HZ series).

Continuing to refer to FIGS. 1 and 2, the system 10 may accordingly include a power convertor or electric convertor 56 coupled to the heat exchanger by wires 58 and configured to convert electrical energy output by the first TEG 54 to a form suitable for use by, for example, the electrical system of the vehicle 12. The electric converter 56 may include a buck/boost converter to regulate the voltage or current output by the electric converter 56, as will be well understood by those in the electrical arts.

In another embodiment, the heat exchanger 18 may also include or define an engine coolant chamber 60 coupled to the internal combustion engine 14 by, for example, hoses 62 configured transport engine coolant 64 to and from the internal combustion engine 14. In general, the engine coolant chamber is configured to guide the engine coolant 64 through the heat exchanger 18. In some circumstances a temperature difference may be present between the engine coolant chamber 60 and the fluid 24, and so the heat exchanger may advantageously include a second TEG 66 configured to couple thermally the engine coolant chamber 60 to the absorber fluid chamber 52 in a manner effective to heat the CO2 absorbent fluid 24 by heat from the engine coolant 64 to further release CO2 gas from the CO2 absorbent fluid 24 and generate electricity in response to a temperature difference therebetween.

It is recognized that the temperature of the exhaust gas 16 may exceed the maximum temperature of some TEGs, and so the heat exchanger may advantageously include a bypass valve 70 operable to an open state and a closed state. When the bypass valve 70 is operated to the closed state, none of the exhaust gas 16 passes through a pipe 72 that bypasses the exhaust gas chamber 50, and so the temperature difference across the first TEG 54 is maximized. When the bypass valve 70 is operated to the open state, all or part of the exhaust gas 16 passes through the pipe to prevent overheating the first TEG 54.

It was discovered that fluid such as water may precipitate from the exhaust gas 16 into the exhaust gas chamber 50, and so the heat exchanger 18 may advantageously include a drain valve 74 operable to an open state and a closed state. When the drain valve is operated to the open state, fluid accumulated in the exhaust gas chamber 50 may be drained. Alternatively, the drain valve 74 may be replaced with a drain orifice (not specifically shown) having a fixed orifice size selected to drain fluid accumulated in the exhaust gas chamber. By way of example and not limitation, a suitable orifice size is a half-millimeter (0.5 mm). A drain orifice may be advantageous because it avoids the complexity and expense of an operable drain valve. However, if the potential of having fluid continuously drain from the system is undesirable, the drain valve 74 may be preferable.

Figure 3:
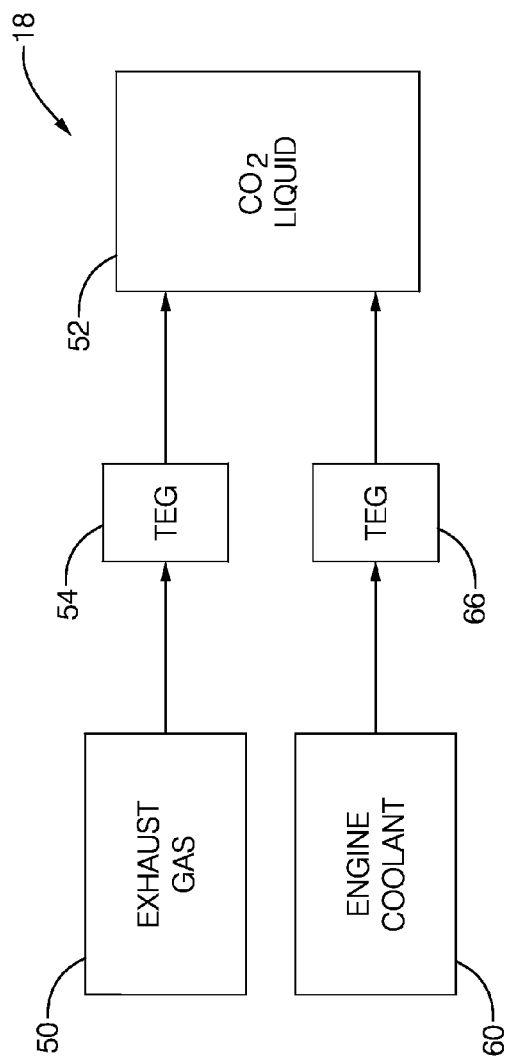
FIG. 3 is a diagram of a heat exchanger in the system of FIG. 1 in accordance with one embodiment.

FIG. 3 is a simplified version of FIG. 2 that illustrates how heat (shown as arrows) typically flows from one region of the heat exchanger to another. Preferably a TEG (54, 66) is in direct thermal contact to the chamber (50, 52, 60) to which the TEG is coupled thermally. As used herein, direct thermal contact means that the materials and assembly method used are selected to minimize heat transfer resistance between the chambers to which the TEG is coupled thermally. As such, for example, the first TEG 54 is preferably in direct thermal contact with the exhaust gas chamber 50 and the absorber fluid chamber 52 so that the amount of heat flowing through the first TEG 54 is maximized to maximize the amount of electricity generated by the first TEG 54. As describe above, a second embodiment of the heat exchanger may include a second TEG 66 in direct thermal contact with the absorber fluid chamber 52 and an engine coolant chamber 60.

Figure 4:
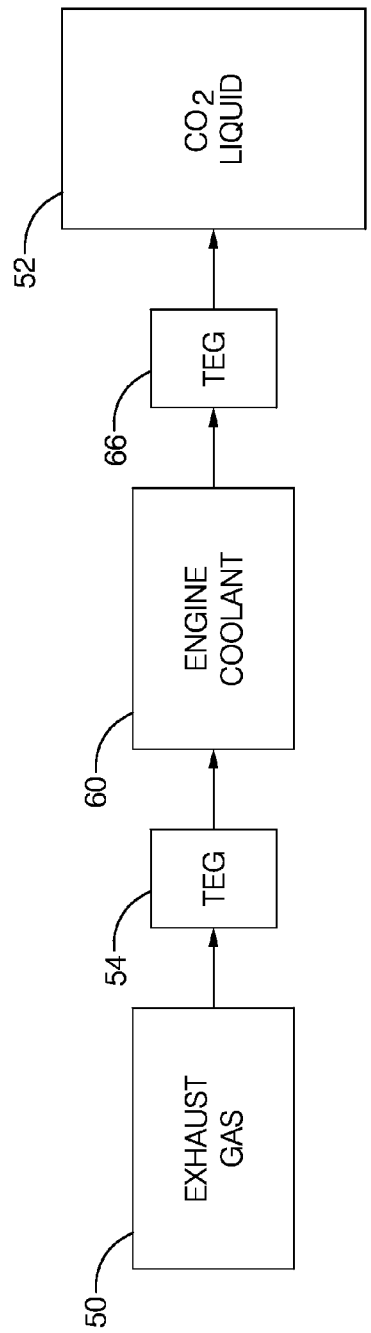
FIG. 4 is a diagram of a heat exchanger in the system of FIG. 1 in accordance with one embodiment.

FIG. 4 illustrates an alternative configuration of a heat exchanger 18'. The configuration shown in FIG. 3 may be characterized as a parallel configuration, while the configuration shown in FIG. 4 may be characterized as a series or serial configuration. In this configuration, the heat exchanger 18' includes an engine coolant chamber 60 and a second TEG 66 interposed between the first TEG 54 and the absorber fluid chamber 52. In the serial configuration, the heat from the exhaust gas is transferred through the first TEG 54 into the engine coolant. This combines all of the heat already in the coolant from the engine 14 as well as the heat in the exhaust gas into the engine coolant. As such, all of the heat energy would flow through the second TEG 66 into the CO2 liquid. While not subscribing to any particular theory, this configuration under certain circumstances may generate more electrical energy than in the parallel configuration. A potential disadvantage the serial configuration is that there would be more thermal resistance in the heat exchange from the exhaust gas through the TEGs to the CO2 liquid. However, this can be compensated by improving the efficiency of the heat exchangers (more surface area) or by selecting a CO2 liquid with ether more CO2 absorption or with a lower specific heat.

Accordingly, a system 10 for separating and storing carbon dioxide (CO2) gas from exhaust produced by an internal combustion engine 14, and producing electric energy, is provided. The system 10 is particularly well suited for use on a vehicle because the vehicle regularly visits refueling stations where the storage tank 38 can be emptied, and the production of electric energy using waste heat from the combustion process improves overall efficiency of the internal combustion engine 14 or vehicle 12.

While this invention has been described in terms of the preferred embodiments thereof, it is not intended to be so limited, but rather only to the extent set forth in the claims that follow.

We claim:

1. An electricity generating heat exchanger for a vehicle equipped with an exhaust gas carbon dioxide (CO2) separator, said heat exchanger comprising:
an exhaust gas chamber configured to guide engine exhaust through the heat exchanger;
an absorber fluid chamber configured to guide CO2 absorbent fluid through the heat exchanger; and
a first thermal electric generator (TEG) interposed between and coupled to the exhaust gas chamber and to the absorber fluid chamber in a manner effective to heat the CO2 absorbent fluid by conducting heat from the engine exhaust to release CO2 gas from the CO2 absorbent fluid and generate electricity in response to a temperature difference therebetween.

2. The heat exchanger in accordance with claim 1, wherein the heat exchanger further comprises
an engine coolant chamber configured to guide engine coolant through the heat exchanger; and
a second TEG configured to couple thermally the engine coolant chamber to the absorber fluid chamber in a manner effective to heat the CO2 absorbent fluid by heat from the engine coolant to further release CO2 gas from the CO2 absorbent fluid and generate electricity in response to a temperature difference therebetween.

3. The heat exchanger in accordance with claim 1, wherein the heat exchanger further comprises a bypass valve operable to an open state and a closed state, and configured to allow engine exhaust to bypass the heat exchanger when operated to the open state.

4. The heat exchanger in accordance with claim 1, wherein the heat exchanger further comprises a drain valve operable to an open state and a closed state, and configured to drain the exhaust gas chamber when operated to the open state.

5. The heat exchanger in accordance with claim 1, wherein the heat exchanger further comprises a drain orifice having a fixed orifice size selected to drain fluid accumulated in the exhaust gas chamber.

6. The heat exchanger in accordance with claim 1, wherein the first TEG is in direct thermal contact with the exhaust gas chamber and the absorber fluid chamber.

7. The heat exchanger in accordance with claim 6, wherein the heat exchanger further comprises a second TEG in direct thermal contact with the absorber fluid chamber and an engine coolant chamber.

8. A system for separating carbon dioxide gas from internal combustion engine exhaust, said system comprising:
   an internal combustion engine configured to emit exhaust gas when operating, said exhaust gas characterized as having an elevated temperature and comprising carbon dioxide;
   a heat exchanger configured to cool the exhaust gas emitted by the internal combustion engine;
   a scrubber tank containing a carbon dioxide absorbent fluid and configured to bubble exhaust gas from the heat exchanger through the carbon dioxide absorbent fluid, whereby carbon dioxide gas is absorbed by the carbon dioxide absorbent fluid;
   a pump configured to urge the carbon dioxide absorbent fluid through the heat exchanger; and
   a carbon dioxide storage means configured to store the carbon dioxide released in the heat exchanger,
   wherein said heat exchanger comprises
   an exhaust gas chamber configured to guide engine exhaust through the heat exchanger;
   an absorber fluid chamber configured to guide CO2 absorbent fluid through the heat exchanger; and
   a first thermal electric generator (TEG) interposed between and thermally coupled to the exhaust gas chamber and to the absorber fluid chamber in a manner effective to heat the CO2 absorbent fluid by conducting heat from the engine exhaust to release CO2 gas from the CO2 absorbent fluid and generate electricity in response to a temperature difference therebetween.

9. The system in accordance with claim 8, wherein the heat exchanger further comprises
   an engine coolant chamber configured to guide engine coolant through the heat exchanger; and
   a second TEG configured to couple thermally the engine coolant chamber to the absorber fluid chamber in a manner effective to heat the CO2 absorbent fluid by heat from the engine coolant to further release CO2 gas from the CO2 absorbent fluid and generate electricity in response to a temperature difference therebetween.

10. The system in accordance with claim 8, wherein the heat exchanger further comprises a bypass valve operable to an open state and a closed state, and configured to allow engine exhaust to bypass the heat exchanger when operated to the open state.

11. The system in accordance with claim 8, wherein the heat exchanger further comprises a drain valve operable to an open state and a closed state, and configured to drain the exhaust gas chamber when operated to the open state.

12. The system in accordance with claim 8, wherein the heat exchanger further comprises a drain orifice having a fixed orifice size selected to drain fluid accumulated in the exhaust gas chamber.

13. The system in accordance with claim 8, wherein said system further comprises a radiator configured to receive carbon dioxide absorbent fluid from the heat exchanger and cool the carbon dioxide absorbent fluid as the carbon dioxide absorbent fluid flows into the scrubber tank.

14. The system in accordance with claim 8, wherein the first TEG is in direct thermal contact with the exhaust gas chamber and the absorber fluid chamber.

15. The system in accordance with claim 14, wherein the heat exchanger further comprises a second TEG in direct thermal contact with the absorber fluid chamber and an engine coolant chamber.

\* \* \* \* \*